March 14, 1961 M. E. WOOD 2,974,895
SPINNING REEL

Filed Jan. 5, 1955 3 Sheets-Sheet 1

INVENTOR.
MORRIS E. WOOD
BY Charles S. Penfold
ATTORNEY

March 14, 1961 M. E. WOOD 2,974,895
SPINNING REEL
Filed Jan. 5, 1955 3 Sheets-Sheet 2
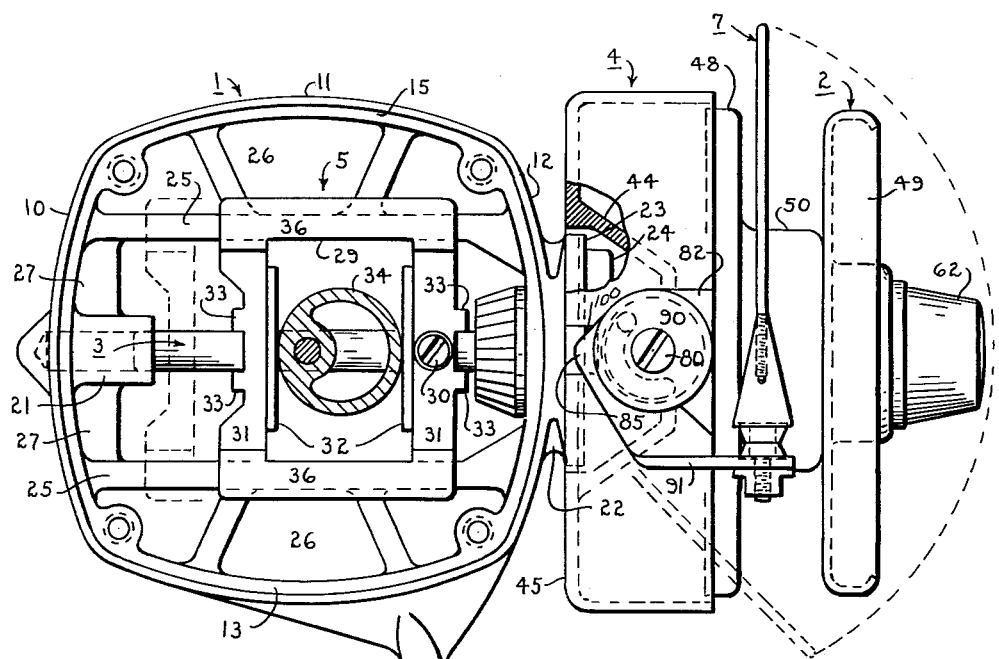
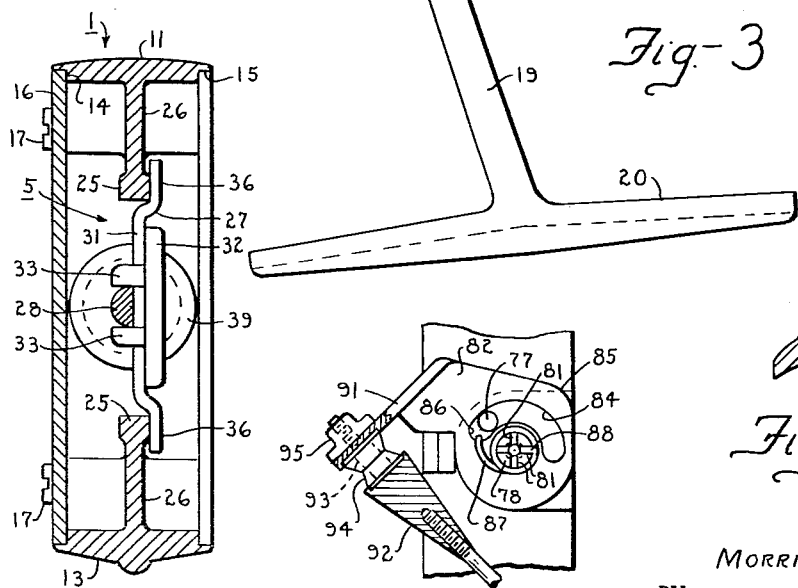
INVENTOR.
MORRIS E. WOOD
BY
Charles S. Penfold
ATTORNEY March 14, 1961 M. E. WOOD 2,974,895
SPINNING REEL
Filed Jan. 5, 1955 3 Sheets-Sheet 3
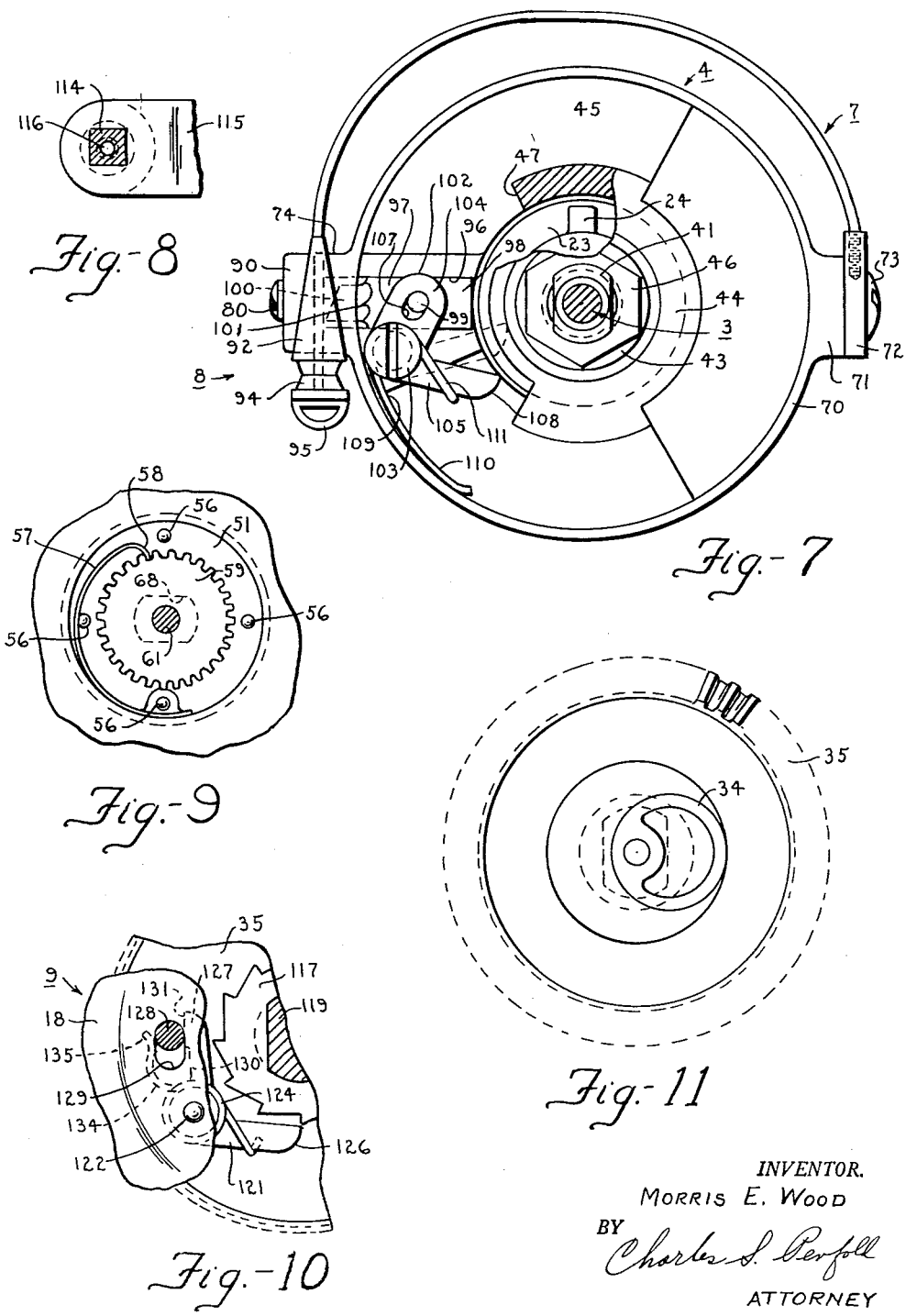
INVENTOR.
MORRIS E. WOOD
BY Charles S. Perfall
ATTORNEY

United States Patent Office 2,974,895
Patented Mar. 14, 1961

2,974,895

SPINNING REEL

Morris E. Wood, Bronson, Mich., assignor to Higbie Manufacturing Company, Rochester, Mich., a corporation of Michigan Filed Jan. 5, 1955, Ser. No. 480,016

9 Claims. (Cl. 242—84.21)

This invention relates generally to fishing tackle, and more particularly is directed to fishing reels of the spinning type.

The majority of reels of this character include, among other things, a cup shaped rotor, a spool, a bail or line guide connected to the rotor, actuating mechanism operatively connected to the rotor and spool, and a drive assembly having a crank for operating the mechanism in a manner whereby to simultaneously rotate the rotor and reciprocate the spool relative to the motor.

With the foregoing in mind one of the principal objects of the invention is to provide a spinning reel in which improved principles of design and construction are embodied in each of the above components.

More particularly, an important object of the invention is to provide a reel in which the actuating mechanism is operatively connected with the rotor, spool assembly and drive assembly in a unique manner.

A particular object of the invention is to provide a new way of connecting the bail and rotor together so that the bail can be manually pre-set to an inoperative position, preparatory to making a cast and after the cast is made and the reel is again placed in operation the bail will be automatically released so it will return to an operative position for guiding a line onto the spool. More specifically in this respect, the rotor is provided with a mechanism which coacts with the bail and fixed means on the reel for holding and releasing the bail when desired.

Another object of the invention is to provide a reel in which improved means are utilized to operatively connect the spool assembly with the shaft on which it is mounted.

A specific object of the invention is to provide a spool assembly comprised of components which are operatively associated together in a novel way.

A further object of the invention is to provide the spool assembly with means for preventing a line from receding into the rotor and being caught thereon.

A significant object of the invention is to provide a novel click mechanism associated with the spool assembly and a ratchet and pawl mechanism associated with the drive assembly, all of which are mounted in a unique manner.

An additional object of the invention is to provide a reel which is so designed and constructed that it may be readily modified for use by either a left or right-handed person.

A further object of the invention is to provide a reel which offers advantages with respect to durability, manufacture, assembly, cost and efficient operation.

Other attributes and advantages of the invention will become apparent after the description hereinafter set forth is considered in conjunction with the drawings annexed hereto.

In the drawings:

Figure 3 is a side view of the reel with portions removed and with portions in sections to exemplify details of design and construction;

Figure 4 is a transverse section taken through the reel housing to illustrate details of a part of the actuating mechanism;

Figure 5 is a view, partially in section, showing the bail holding mechanism;

Figure 6 is a transverse section taken through the rod or pole engaging plate of the reel;

Figure 7 is a front view of the reel, with the spool removed to show details of the rotor, the manner of connecting the bail thereto and the unique means employed for releasably holding the bail in the operative line guiding position;

Figure 8 is a view, partially in section, showing the connection between the drive shaft and crank therefor;

Figure 9 is a partial view showing certain details of the spool assembly and click mechanism therefor;

Figure 10 is a view showing details of a ratchet mechanism; and

Figure 11 is a view depicting a driving part of the actuating or operating mechanism.

Figure 1:
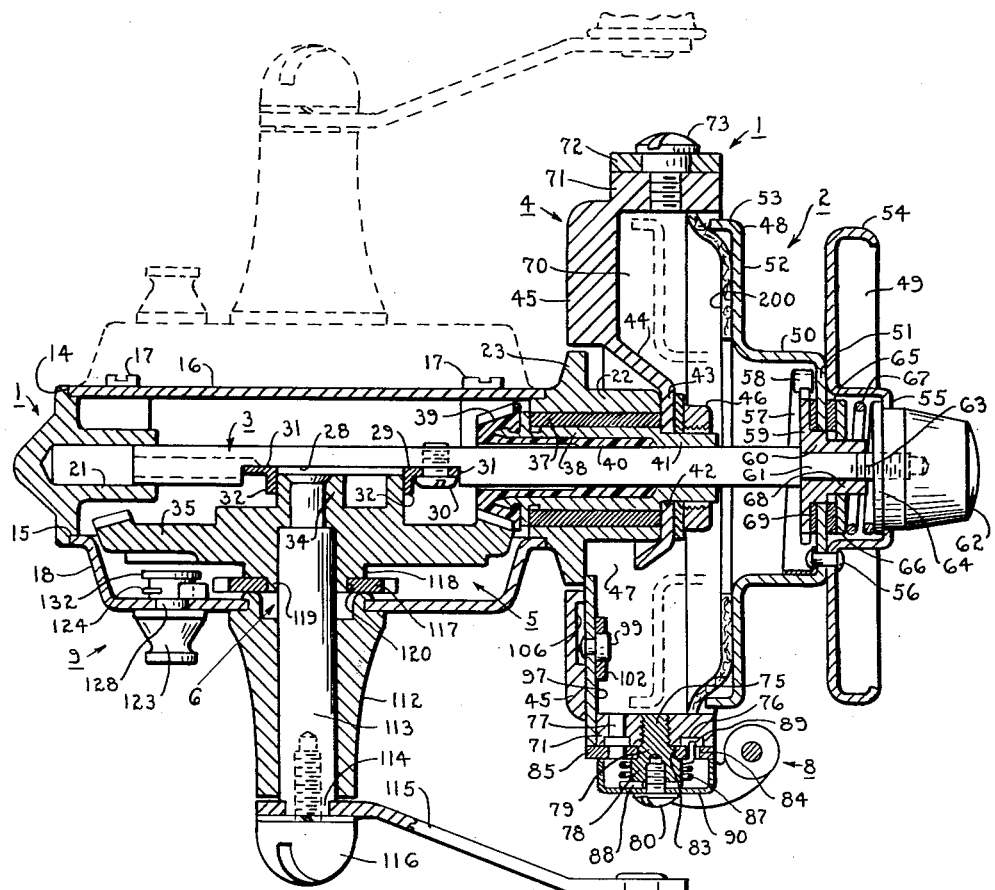
Figure 1 is a longitudinal sectional view through the reel.

The reel is comprised of a plurality of sub-assemblies so as to facilitate manufacture and assembly thereof. More particularly in this regard, and referring to Figures 1, 3 and 7 of the drawing, the reel includes, among other things, a housing generally designated 1, a spool assembly 2 carried by a reciprocable shaft 3, a rotor 4, actuating means 5, a drive assembly 6 operatively connected to the shaft, a bail 7 carried by the rotor, locking means 8 for the bail, and a ratchet mechanism 9.

Referring now to Figures 1, 3 and 4 of the drawing the housing 1, constituting a component of the reel, is preferably cast in the form of a relatively short tube, generally square in cross-section with four side walls 10, 11, 12 and 13, the marginal ends of which are correspondingly recessed as indicated at 14 and 15. A tail plate 16 is detachably secured in the recess 14 by screws 17 and a head-cap 18 supporting the drive assembly 6 is detachably secured in the recess 15 by screws not shown.

The side wall 13 of the housing is provided with an angularly disposed pillar or stem 19 having a plate portion 20 for engaging a fish pole or rod.

The side wall 10 of the housing, as shown in Figures 1 and 3, is formed with a tubular bearing 21 for receiving an end of the reciprocable spool shaft 3. The outer end of the bearing is located exteriorly of the wall and is closed to exclude entry of foreign matter into the housing. The side wall 12 opposite the side wall 10 is formed with a tubular outwardly extending enlargement 22 aligned with the tubular bearing 21 on side wall 10. As shown in Figures 3 and 7 of the drawing the enlargement is provided with an annular flange 23 and a radial lug 24, the purpose of which will be described subsequently. The side walls are joined together by a pair of parallel rails 25 located on opposite sides of the shaft 3 as depicted in Figures 3 and 4. It will be noted that the rails are adequately reenforced by web structure 26 at their juncture with the walls and that the tubular bearing 21 is also joined to the rails by web structure 27 to impart strength and rigidity to the bearing and housing.

The spool shaft 3 is notched at 28 as shown in Figures 1 and 4 and a driven member or cam follower 29, constituting a component of the actuating means 5, is detachably secured in a fixed position in the notch by a screw 30. This member is preferably in the form of a rectangular frame having a pair of parallel flat portions 31 disposed transverse to the spool shaft and inset between the rails so that the ends of the portions engage opposed surfaces of the rails as shown in Figures 3 and 4. Each of the flat portions is also provided with an outturned flange 32 along its inner marginal edge and a pair of inturned fingers 33, the latter of which straddle the shaft 3 as viewed in Figures 3 and 4. The opposed flanges 32 serve as tracks and a uniform motion cam 34 is integral with a bevel gear 35. The cam is disposed between the tracks 32 so that when motion is imparted to the cam through the drive assembly the shaft 3 will be reciprocated. The cam follower 29 also includes a pair of parallel flat shoe portions 36 which engage the outer faces of the rails 25. This arrangement lends balance, stability and smoothness of operation to the slidable relationship between the follower and rails. It will be noted that the cam follower also serves to prevent rotation of the spool shaft in its bearings.

As depicted in Figure 1, a tubular bearing 37 is press-fitted into the tubular enlargement 22 on the wall 12 of the housing and a tubular shaft 38 supporting a tubular pinion gear 39 is rotatably mounted in the bearing. The pinion may be constructed of any suitable material but as herein shown is made of nylon which is moulded in interlocking fixed relationship with the tubular shaft 38 to constitute an integral unit. The pinion 39 has a cylindrical portion 40 extending into the tubular shaft 38 and is formed to provide what might be termed an oilless bearing for the reciprocable spool shaft 3. The tubular shaft includes a squared reduced threaded end portion 41 which extends outwardly from the tubular enlargement 22 and through a rectangular opening 42 provided in the end wall 43 of a generally frusto-conical formation 44, the latter projecting inwardly from a bottom wall 45 of the rotor 4. A nut 46 is attached to the threaded end portion 41 of the tubular shaft to secure the unit consisting of the interlocked pinion and shaft to the rotor. The tubular shaft 38, pinion 39 and rotor 4 are thus connected to rotate in unison. As shown in Figure 1, the shaft 38 is provided with a radial flange which may bear against the inner end of the enlargement 22 and/or the bearing 37. It will be noted that the bottom of the formation 44 on the rotor is open and receives the flange 23 of the tubular enlargement of the housing and that the formation is formed with a relatively large side clearance opening 47 so that a part of a bail and/or locking mechanism generally designated 8 in Figures 1, 5 and 7 can cooperate with the radial lug 24 on the enlargement, the purpose of which will be described subsequently.

The spool assembly which moves axially substantially into and out of the rotor as the latter rotates when the drive mechanism is operated will now be described. The spool assembly 2 comprises a rear part 48 and a front part 49. The rear part of the spool includes a cylindrical portion 50 for a line, an end wall 51, a radial flange 52 extending from the cylindrical portion and a short rearwardly extending axial flange 53 extending from the radial flange in concentric relationship to the rotor 4. The front part 49 of the spool is formed with a forwardly extending peripheral flange 54 and a forwardly extending cylindrical formation having an end wall 55 provided with an aperture therein. The diameter of the front part is preferably slightly less than the rear part so as to facilitate release of the line during a cast. As shown in Figures 1 and 9, the end wall 51 of the rear part 48 of the spool is permanently secured in abutting relationship to the base portion of the front part of the spool by four rivets 56. One of these rivets also serves to secure a generally arcuate leaf spring 57 to the end wall 51 of the spool part 48. This spring is provided with an ear through which the securing rivet extends and also has an inturned portion provided with a finger 58 for selective yieldable engagement with teeth provided on a radial flange 59 of a mounting member 60 press fitted on a reduced cylindrical portion 61 of the spool shaft 3 for movement therewith.

The spool carries a tapered nut 62 for engaging a threaded end 63 of the shaft 3 for detachably securing the spool to the mounting 60. The nut is provided with a flange 64 located and held within the cylindrical formation of the front part of the spool and between the walls 51 and 55 of the spool parts. A friction element 65 of leather or the equivalent, a metal washer 66 and a helical spring 67 are also housed in the aforesaid cylindrical formation with the element 65 forcibly bearing against the end wall 51 of spool part 48 and the washer 66 against this element and the flange 64 of the nut against the wall 55 of the front spool part by the axial thrust of the helical spring 67. The friction element 65 is provided with a clearance opening through which a squared portion 68 of the mounting 60 extends and the washer 66 is provided with a squared opening which receives the portion 68 in a manner to cause the washer to move with the mounting and shaft. Another friction element 69, preferably corresponding to the friction element 65, is disposed between the radial flange 59 of the mounting and the wall 51 of the rear spool part 48 for frictional engagement therewith. The arrangement is such that the frictional drag between the spool and the mounting member 60 can be readily varied by manipulating the nut and when the spool is caused to rotate with respect to the mounting, due to an excessive pull on the line, the leaf spring 57 will produce a clicking sound as its finger 58 engages the teeth on the mounting member.

As set forth above, one of the objects of the invention is to provide means for preventing a line from receding off the spool into the rotor. This is preferably accomplished by providing a ring of felt 200 or the equivalent on the inner side of the radial flange 52 of the rear spool part 48 so that the peripheral edge of the felt will engage the inner surface of the side wall 70 of the rotor as shown in Figure 1. The felt is preferably cemented to the spool part. It will be noted that the felt also engages the rearwardly extending axial flange 53 of part 48 so that only one of the arrises of the peripheral edge will lightly engage the rotor.

The bail 7 and its connection with the rotor will now be described. The rotor 4 is preferably cast from aluminum and includes the base wall 45 and an annular axial or side wall 70. The ends of the bail 7 are connected to the side wall at substantially diametrically opposed locations. More specifically in this regard, the side wall of the rotor is provided with a round boss 71 and one end of the bail is provided with a fitting 72 through which a screw 73 extends into the boss for pivotally securing the fitting thereto. The fitting and boss are of a size to impart a stable motion to the bail. It will be noted that the bail is preferably constructed of wire and that the fitting is provided with a hole in which one end of the bail is preferably anchored by threading. The side wall of the rotor is also provided with another boss 74 similar to the boss 71. The boss 74 is provided with a threaded center aperture within which a pivot stud 75 is threadedly secured. The boss is also provided with an annular recess 76 disposed in concentric relationship to the aperture. The base of the recess is provided with a hole and a pin 77 is fixed therein so that the outer end of the pin projects outwardly from the recess. The pivot stud 75 includes a head portion 78 provided with a reduced cylindrical portion 79 and an axially extending threaded aperture which receives a screw 80. The outer end of the head portion 78 of the stud is provided with four equally spaced radial slots 81.

A bracket is secured for pivotal movement on the stud 75. This bracket, as clearly shown in Figures 1, 3 and 5, includes a flat portion 82 having an aperture 83 therein through which the cylindrical portion 79 of the stud extends and an arcuate slot 84 through which the pin 77 extends. The flat portion 82 of the bracket is further provided with an arcuate portion serving as a stop 85 and with an edge serving as an abutment 86. A coiled spring 87 surrounds the pivot stud 75 and one end of the spring is inturned radially at 88 and seated in one of the radial slots 81 in the head of the stud and the other end of the spring is provided with a hook 89 caught in one end of the arcuate slot 84 in a manner to place the spring under tension and normally maintain the bail in the line retrieving position shown in Figures 3 and 7. The pin 77 engages the other end of the arcuate slot to maintain the bail in this position. A cover 90 conceals the spring and is held in place by the screw 80 secured in the threaded aperture of the stud. If the strength of the spring becomes weak through use or additional spring tension is required the cover 90 can be removed so that the inturned end 88 of the spring can be relocated in another radial slot 81 to obtain the tension desired.

The bracket above referred to has an offset 91 and a short shaft 92 is secured thereto. This shaft has a reduced cylindrical bearing portion 93 which rotatably supports a tubular roller 94 having a V-shaped line guiding surface. The shaft is formed with a reduced portion which extends through an aperture in the offset with a shoulder on the shaft engaging one side of the offset. The outer end of the reduced portion is threaded and a nut 95 is secured thereto to connect the shaft to the offset of the bracket. It will be noted that the offset and shaft are recessed slightly so as to embrace the ends of the roller to impart stability to the roller and at the same time prevent a line from working in between the ends of the roller and the offset and shaft. It will further be noted that the shaft 92 is tapered and provided with an axial hole within which the other end of the bail is anchored in any suitable way, such as by threading.

The bail is arranged for movement with the rotor in an operative line guiding position substantially parallel to the front side of the rotor as shown in Figure 3 and it can be manually moved to an out of the way angular inoperative position illustrated by the dotted lines in Figure 3. More specifically, the spring 87 serves to urge the bail to the full line operative position with the pin 77 engaging the left end of the arcuate slot 84 in the bracket to limit movement of the bail in a counter-clockwise direction as viewed in Figure 3.

The means generally designated 8 employed for locking the bail in the inoperative position and automatically releasing it from such position is unique and will now be described. As clearly depicted in Figure 7, the base wall 45 of the rotor is provided with a radial guideway 96 which extends through the side wall 70 of the rotor and below the boss 71. The guideway is formed by raised or thickened portions of the base wall of the rotor. A trip member 97 is slidable in the guideway. This member includes a portion 98 provided with a pin 99 and an outer portion 100 of a smaller cross-dimension than portion 98 to form a pair of shoulders 101. The outer portion 100 is disposed for movement outwardly through an opening in the side wall of the rotor and the shoulders 101 are adapted to engage stops on the rotor on opposite sides of the guideway to limit outward travel of the trip member. The outer end of the trip member is bevelled.

An L-shaped lever 102 is pivotally connected to one of the above mentioned thickened portions of the rotor by a screw 103. This lever has a pair of legs 104 and 105. The pin 99 is permanently secured to the trip member end, as shown in Figure 1, a clearance recess 106 is provided in the base of the guideway for the upset end of the pin. This pin extends through a slot 107 provided in the leg 104 of the lever and the end of the leg 105 is rounded at 108.

A generally U-shaped spring 109 is secured to the screw 103 and a long portion 110 of the spring bears against the side wall of the rotor and a shorter portion 111 has a hook which embraces the leg 105 of the lever 102 so that the lever is normally urged in a counter-clockwise direction as viewed in Figure 7 to urge the trip member 97 radially outward. The arrangement is such that the spring 109 normally urges the bevelled end of trip member 97 against the stop portion 85 of the bracket as shown in Figures 1 and 3. However, when the bail is manually moved more than one hundred and eighty degrees to the inoperative position indicated by the dotted lines in Figure 3 the trip member will be moved automatically outward by the spring 109 to place the bevelled end of the member in engagement with the abutment 85 on the offset of the bracket as shown in Figure 5 to hold the bail in such position until it is released. When the trip member moves outwardly the lever 102 is pivoted to locate the leg 105 thereof in the clearance opening 47 of the frusto-conical formation 44 of the rotor so that the rounded end 108 of the leg 105 is disposed for engagement by the fixed lug 24 on the enlargement 22 of the housing as shown in Figure 7. When the rotor is rotated in a counter-clockwise direction as viewed in Figure 7, the rounded end 108 of the leg 105 will engage the lug 24 and prevent further rotation of the rotor in this direction, but when rotated in a reverse or clockwise direction a predetermined extent the end of the leg will engage the other side of the lug 24 and cause the lever 102 to gradually pivot and in turn withdraw the trip member and thereby allow the bail, through the action of the spring 87, to snap the bail back to its operative line guiding position as shown by the full lines in Figure 3.

The drive assembly, generally designated 6, supported on the head-cap 18 and the components associated therewith will now be described. The head-cap is cup-shaped in form and its base wall is provided with an opening through which the reduced end of a tubular bearing support 112 is extended and upset for permanently securing the support to the cap. A drive shaft 113 is journalled in this support and its outer end is provided with a squared portion 114 and a crank 115 having a squared opening therein receives the squared portion of the shaft and a screw 116 connects with an internally threaded hole in the shaft for securing the crank to the shaft as shown in Figures 1 and 8. A handle is carried by the crank. The inner end of the shaft is anchored to the drive gear 35 which is in engagement with the pinion gear 39. It will be noted that the drive shaft 113 extends through the bevel gear 35 including the cam 34 integral therewith.

Figure 2:
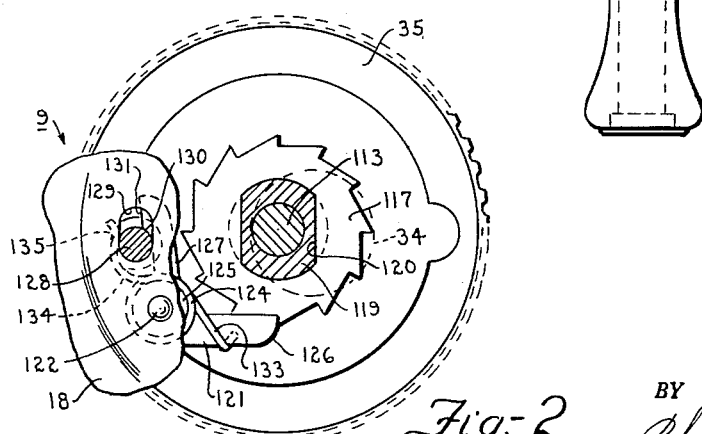
Figure 2 is a transverse sectional view illustrating structural details of the ratchet and pawl mechanism.

The ratchet and pawl mechanism, generally designated 9, may be designed and constructed in various ways but as illustrated in Figures 1, 2 and 10 is supported on the head-cap 18 and cooperates with a ratchet wheel 117 carried by the bevel gear 35. More particularly in this regard, the outer side of the bevel gear is provided with an integral round boss 118 having a central squared portion 119. The ratchet wheel 117 has a squared opening 120 therein which receives the squared portion 119 to detachably connect and key the wheel to the gear. The ratchet wheel engages the upset end of the tubular bearing 112.

The ratchet and pawl mechanism also includes an L-shaped pawl 121 carried by a pivot 122 mounted on the head-cap 18, a manually operable button 123 carried by the cap and a spring 124 operatively connected to the pawl and button. The pawl includes a body portion 125 through which the pivot 122 extends, an offset leg 126 having a free end constituting a detent for selectively engaging the teeth on the ratchet, and a leg 127 which cooperates with a shank 128 carried by the button and extends through a straight slot 129 provided in the cap 18. The leg 127 is provided with a notch 130 and an offset rest portion 131. The shank 128 of the button is provided with a head 132. The button and slot are so arranged that the button is pivotally mounted for slidable movement in the slot in a chordal direction. The spring 124 includes a coiled portion surrounding the shank 128 and is disposed between the head 132 of the shank and the lever. The spring also includes a leg portion 133 having a hook thereon which embraces the leg 126 of the lever and a leg portion provided with an arcuate portion 134 disposed opposite the notch 130 and an angled end portion 135 disposed opposite the rest portion 131. The arrangement is such that when the button is moved to the end of the slot 129 in one direction, the angled end portion 135 and the rest portion 131 generally form a V and cooperate with the shank 128 to detain the lever in a position whereby the detent end of the leg 126 of the lever will not engage the ratchet 117 as shown in Figure 10. However, when the button or knob 123 is manually moved to place the shank at the other end of the slot 129 the notch 130 and arcuate portion 134 of the spring will embrace the shank and retain the lever in a spring pressed operative position with the leg 126 of the lever disposed to selectively engage the teeth on the ratchet as shown in Figure 2 to provide clicking sound and at the same time hold the gear 35 against movement in a clockwise direction as viewed in Figure 2 as it is advanced by operation of the crank in a counter-clockwise direction.

As mentioned in the fore part of the specification one of the objects of the invention is to provide a reel that can be readily modified for use by a left-handed person. This is accomplished in part by making the recesses 14 and 15 in the housing of corresponding size and shape as well as the tail plate 16 and head-cap 18 so that the plate and cap can be secured in either of the recesses as exemplified by the dotted lines in Figure 1. At the factory, some of the components will be made directly opposite to those illustrated and then will be assembled in reverse positions to obtain a reel which is operable and suitable for a left-handed person.

Having thus described my invention, it is obvious that various modifications may be made in the same without departing from the spirit of the invention, and, therefore, I do not wish to be understood as limiting myself to the exact form, construction, arrangement, and combination of parts herein shown and described.

I claim:

1. A spool assembly comprising a front part and a rear part secured to the front part, one of said parts being formed with a hollow immovable enlargement provided with an opening, the other part having an aperture aligned with the opening for receiving a shaft provided with a threaded portion, a nut secured against removal in the opening for engaging the threaded portion of the shaft when the latter is inserted into said aperture for attaching the spool assembly to the shaft, a friction element disposed in the enlargement, a member disposed in the enlargement and adapted for connection with the shaft, and a spring arranged in the enlargement between the member and nut for urging the element against the rear part of the spool.

2. A spool formed with a hollow immovable enlargement having a first wall provided with an opening and a second wall axially spaced from the first wall and provided with an aperture, a nut trapped in the opening for connecting the spool to a shaft adapted for insertion into the aperture, a friction element disposed in the enlargement, and resilient means arranged between the friction element and nut so that the latter can be manipulated to cause the resilient means to force the element against the second wall of the spool.

3. A spool comprising a rear part provided with an aperture and a hollow immovable enlargement having an end wall provided with an opening axially spaced from the aperture, a nut disposed against removal in the opening for attaching the spool to a threaded portion of a shaft when the latter is inserted into said aperture, a first friction element disposed in the enlargement and against one side of the rear part and a second friction element bearing against the opposite side of the rear part, a member disposed in the enlargement and adapted for connection with the shaft, and a spring arranged in the enlargement between the member and nut to cause the elements to forcibly engage the rear part.

4. A spinning reel comprising a housing, a cup-shaped rotor rotatably mounted on the housing, a shaft extending into the housing and rotor, a spool carried by the shaft, means for rotating the rotor and reciprocating the shaft to move the spool into and out of the rotor, said shaft being provided with abutment means adapted for movement therewith, said spool having a front part provided with an immovable enlargement and a rear part provided with a cylindrical portion, said abutment means having a shoulder portion disposed in the cylindrical portion, a first friction element surrounding the shaft and disposed between and engaging said shouldered portion and one side of the rear part of the spool, a second friction element disposed in the enlargement and engaging the other side of the rear part, a spring disposed in the enlargement, said second friction element and spring being held against removal from said enlargement, and a nut trapped in the enlargement and connected to the shaft for compressing the spring to cause the elements to produce a drag effect on the spool whenever it rotates with respect to the shaft.

5. A spool assembly comprising a front part and a rear part, one of said parts being formed with a hollow immovable enlargement provided with an opening, the other part having an aperture aligned with the opening for receiving a shaft provided with a threaded portion, a nut secured against removal in the opening for engaging the threaded portion of the shaft when the latter is inserted into said aperture for attaching the spool assembly to the shaft, and a friction element disposed in the enlargement for pressure against the rear part of the spool through the assistance of the nut.

6. An assembly of the kind described comprising a spool having a rear part provided with a radial flange and a central cup formation, said formation having a cylindrical wall for supporting a line and a base wall provided with an aperture, said spool also including a front part having an annular flange permanently secured against the base wall of the formation and a central cylindrical formation extending axially away from said base wall, a shaft extending through the aperture and having a threaded end portion disposed in the cylindrical formation, said shaft also being provided with a fixed enlargement having a radial flange disposed in the cup formation, a friction element interposed between the base wall of the cup formation and the radial flange of the enlargement, annular compressible resilient means disposed in the cylindrical formation about the shaft, and a nut connected to the threaded end portion of the shaft for compressing the resilient means to cause the radial flange on the enlargement to force the friction element against the base wall for retarding relative rotational movement between the spool and shaft as desired.

7. An assembly of the kind described comprising a spool having a rear part provided with a radial flange and a central cup formation, said formation having a cylindrical wall for supporting a line and a base wall provided with an aperture, said spool also including a front part having an annular flange permanently secured against the base wall of the formation and a central cylindrical formation extending axially away from said base wall, a shaft extending through the aperture and having a threaded portion extending into the cylindrical formation, a fitting keyed to the shaft and having a radial flange disposed in the cup formation and a portion extending through the aperture and into the cylindrical formation, a member keyed to the extending portion of the fitting, a friction element interposed between the base wall of the cup formation and the member, annular compressible resilient means disposed in the cylindrical formation about the shaft, and a nut connected to the threaded end portion of the shaft for compressing the resilient means to cause the friction element to be clamped between the member and the base wall of the cup formation and the base wall of the cup formation between this element and the radial flange of the fitting for retarding relative rotational movement between the spool and shaft as desired.

8. An assembly of the kind described comprising a spool having a rear part provided with a radial flange and a central cup formation, said formation having a cylindrical wall for supporting a line and a base wall provided with an aperture, said spool also including a front part having an annular flange permanently secured against the base wall of the formation and a central cylindrical formation extending axially away from said base wall, a shaft extending through the aperture and having a threaded end portion disposed in the cylindrical formation, said shaft also being provided with a fixed enlargement having a radial flange disposed in the formation and a portion extending through the aperture and into the cylindrical formation, a member keyed to the extending portion of the enlargement, a first friction element carried by the enlargement and interposed between the base wall of the cup formation and the radial flange of the enlargement, a second friction element carried by the extending portion of the enlargement and interposed between the member and base wall, and a nut connected to the threaded end portion of the shaft for applying a force to clamp the said base wall between the friction elements for retarding relative rotational movement between the spool and shaft as desired.

9. A subassembly for use in a spinning reel comprising a shaft provided with a fitting and a threaded portion, a rear member provided with an aperture through which the fitting extends, a front cup-like formation engaging the rear member and having an end wall provided with an opening, said shaft extending through said member, fitting and into the formation, a part trapped in said opening and provided with centrally disposed internal threads connected to the threaded portion of the shaft, a plate disposed in the formation and arranged for rotation with the shaft, a friction element disposed in the formation surrounding the shaft and frictionally engaging the plate, and resilient means disposed under compression in the formation for forcing the plate against the friction element, said part being exposed for manual adjustment to control the friction to retard rotation of the member and formation relative to the shaft.

References Cited in the file of this patent

UNITED STATES PATENTS

| | | |
|---|---|---|
| 270,893 | Davis | Jan. 23, 1883 |
| 1,034,491 | Disch | Aug. 6, 1912 |
| 2,080,900 | Shakespeare | May 18, 1937 |
| 2,098,404 | Shakespeare | Nov. 9, 1937 |
| 2,344,209 | Lowe | Mar. 14, 1944 |
| 2,495,621 | Young et al. | Jan. 24, 1950 |
| 2,498,987 | Duncan | Feb. 28, 1950 |
| 2,501,039 | Frisk | Mar. 21, 1950 |
| 2,558,896 | Young et al. | July 3, 1951 |
| 2,705,113 | Bonnano | Mar. 29, 1955 |
| 2,713,463 | Sarah | July 19, 1955 |
| 2,734,693 | Rabezzana | Feb. 14, 1956 |
| 2,746,695 | Clay | May 22, 1956 |

FOREIGN PATENTS

| | | |
|---|---|---|
| 401,336 | Italy | Jan. 16, 1943 |
| 262,494 | Switzerland | Oct. 17, 1949 |